United States Patent
Higuchi et al.

(10) Patent No.: US 11,081,004 B1
(45) Date of Patent: Aug. 3, 2021

(54) HIERARCHICAL PARKING ASSISTANCE BY CONNECTED VEHICLES

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/778,816

(22) Filed: Jan. 31, 2020

(51) Int. Cl.
*G08G 1/14* (2006.01)
*G01C 21/36* (2006.01)

(52) U.S. Cl.
CPC .......... *G08G 1/142* (2013.01); *G01C 21/3617* (2013.01); *G01C 21/3685* (2013.01); *G01C 21/3694* (2013.01); *G08G 1/148* (2013.01)

(58) Field of Classification Search
CPC ....................................................... G06K 9/00
See application file for complete search history.

(56) References Cited

U.S. PATENT DOCUMENTS

| 7,768,426 B2 | 8/2010 | Groft |
| 8,797,187 B2 | 8/2014 | Harber et al. |
| 8,847,790 B2 | 9/2014 | Trum |
| 9,767,690 B2 | 9/2017 | Agrawal et al. |
| 9,870,707 B2 | 1/2018 | Korman |
| 2009/0303079 A1* | 12/2009 | Khim ............... G08G 1/146 340/932.2 |

(Continued)

FOREIGN PATENT DOCUMENTS

| CN | 103345850 A | 10/2013 |
| CN | 104899679 A | 9/2015 |

(Continued)

OTHER PUBLICATIONS

Title: "Streamlining Traffic Flow in Real Time: While Improving the Parking Experience" URL: https://www.parkassist.com/who-we-serve/citywide-guidance/Accessed/Published Date: Jan. 1, 2010. Author(s): n/a. Source: Online Article—Park Assist.

(Continued)

*Primary Examiner* — Nabil H Syed
*Assistant Examiner* — Cal J Eustaquio
(74) *Attorney, Agent, or Firm* — Dinsmore & Shohl LLP

(57) ABSTRACT

A method includes receiving from a vehicle, a position of the vehicle, obtaining locations of one or more available parking spaces from a plurality of parking spaces based at least in part on the position of the vehicle, determining an estimated travel time for the vehicle to arrive at each of the one or more available parking spaces based at least in part on the position of the vehicle and the locations of the one or more parking spaces, obtaining historical usage data for the one or more available parking spaces, and determining a probability that one or more of the available parking spaces will be available at a time when the vehicle arrives at each of the available parking spaces based at least in part on the estimated travel time and the historical usage data.

11 Claims, 13 Drawing Sheets

(56) References Cited

U.S. PATENT DOCUMENTS

| | | | | |
|---|---|---|---|---|
| 2013/0113936 | A1* | 5/2013 | Cohen | G08G 1/14 |
| | | | | 348/148 |
| 2015/0124096 | A1* | 5/2015 | Koravadi | G06K 9/00825 |
| | | | | 348/148 |
| 2015/0346727 | A1* | 12/2015 | Ramanujam | B62D 15/0285 |
| | | | | 701/23 |
| 2016/0231136 | A1* | 8/2016 | Hoch | G06Q 30/0284 |
| 2020/0168091 | A1* | 5/2020 | Batra | G08G 1/065 |

FOREIGN PATENT DOCUMENTS

| | | |
|---|---|---|
| CN | 109656436 A | 4/2019 |
| CN | 110299025 A | 10/2019 |
| JP | 6317849 B1 | 4/2018 |
| KR | 100545540 B1 | 1/2006 |
| KR | 20100064009 A | 6/2010 |
| KR | 101094153 B1 | 12/2011 |

OTHER PUBLICATIONS

Title: "An Intelligent Car Park Management System: Hierarchical Placement Algorithm Based on Nearest Location" URL: https://ieeexplore.ieee.org/document/8418136. Accessed/Published Date: Jul. 23, 2018. Author(s): Burak Kizilkaya, Mehmet Caglar, Fadi Al-Turjman, Enver Ever. Source: Journal—IEEE.

Suhas Mathur, Tong Jin, Nikhil Kasturirangan, Janani Chandrasekaran, Wenzhi Xue, Marco Gruteser, and Wade Trappe, "ParkNet: drive-by sensing of road-side parking statistics," in Proceedings of the 8th International Conference on Mobile Systems, Applications, and Services (ACM MobiSys), pp. 123-136, Jun. 2010.

Takamasa Higuchi, Seyhan Ucar, Onur Altintas, "A Collaborative Approach to Finding Available Parking Spots," in Proceedings of the 2019 90th IEEE Vehicular Technology Conference (VTC2019-Fall), 2019.

Takamasa Higuchi, Seyhan Ucar, Onur Altintas, U.S. Patent Application titled "Cooperative Parking Space Search by a Vehicular Micro Cloud," TMNA ID: 2019-456, filed in Jun. 2019 (not yet published).

* cited by examiner

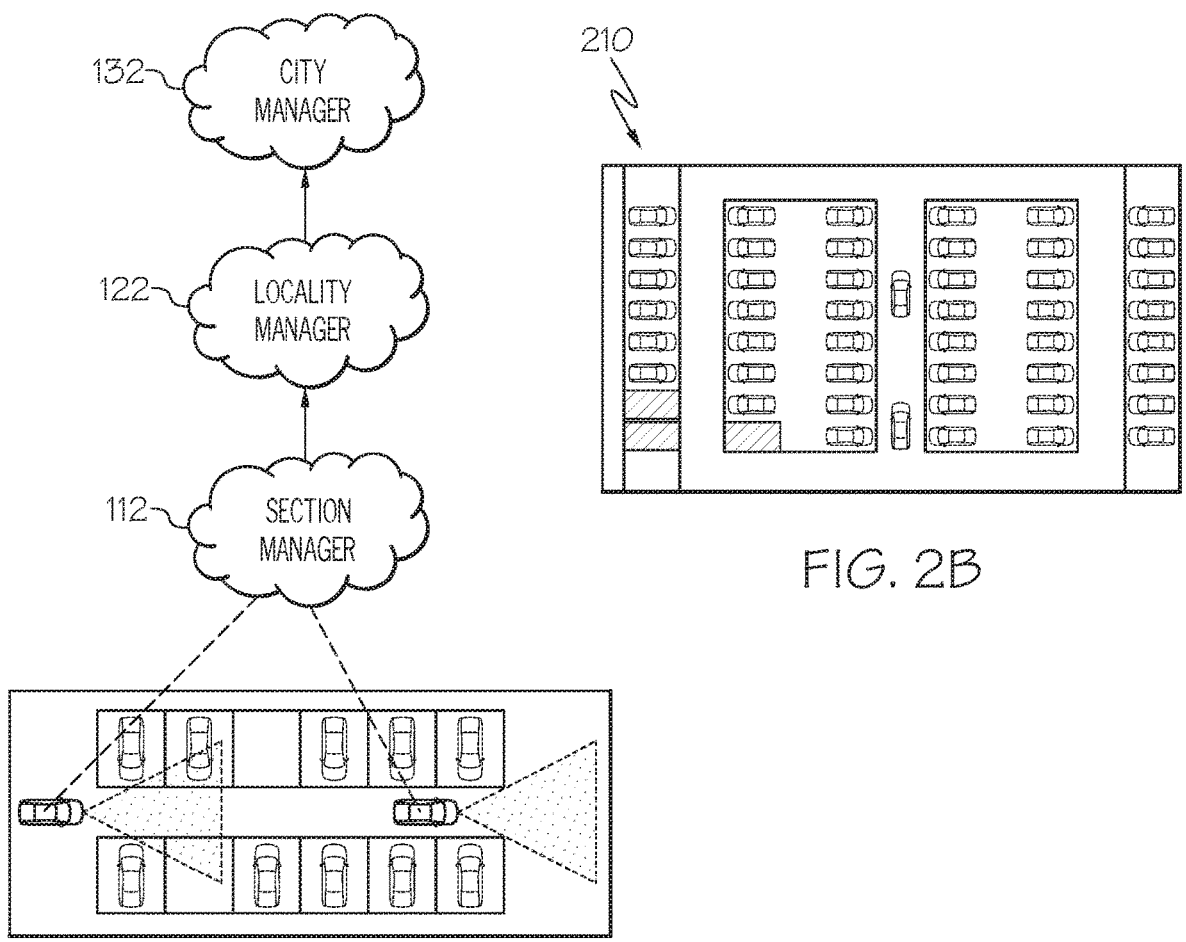
FIG. 2B
FIG. 2A
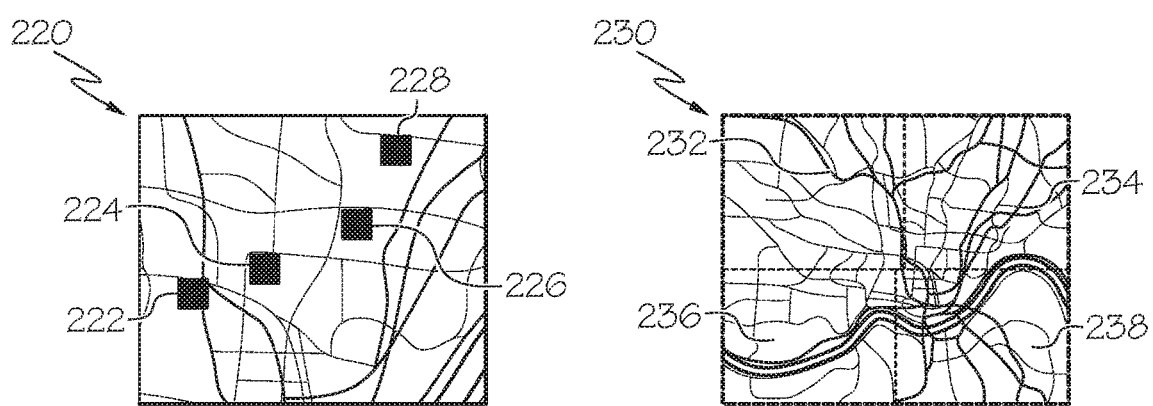
FIG. 2C
FIG. 2D

HIERARCHICAL PARKING ASSISTANCE BY CONNECTED VEHICLES

TECHNICAL FIELD

The present specification relates to systems and methods for assisting drivers in finding parking spaces, and more particularly, to hierarchical parking assistance by connected vehicles.

BACKGROUND

Parking availability information is beneficial to drivers who are looking for available parking in a garage, parking lot, or street parking. Some garages or parking lots have sensors installed to monitor available parking spaces in the parking garages and parking lots, and to provide available parking space information to drivers by displaying the information at the entrance of the parking garages or the parking lots, or changing lights installed above the parking spaces, respectively. However, installation of the monitoring system is not only expensive but also time consuming. Accordingly, more efficient and less expensive ways of monitoring parking spaces is needed.

SUMMARY

In one embodiment, a method includes receiving from a vehicle, a position of the vehicle, obtaining locations of one or more available parking spaces from a plurality of parking spaces based at least in part on the position of the vehicle, determining an estimated travel time for the vehicle to arrive at each of the one or more available parking spaces based at least in part on the position of the vehicle and the locations of the one or more parking spaces, obtaining historical usage data for the one or more available parking spaces, and determining a probability that one or more of the available parking spaces will be available at a time when the vehicle arrives at each of the available parking spaces based at least in part on the estimated travel time and the historical usage data.

In another embodiment, a system includes a plurality of first level managers and at least one second level manager. Each of the first level managers manages a parking facility. The second level manager is in a higher hierarchical level than the first level managers. The second level manager manages a locality. Each of the first level managers is configured to receive sensor data from one or more vehicles within the parking facility managed by the first level manager and position data corresponding to a position of each of the vehicles within the parking facility. The parking facility has a plurality of parking spaces. The second level manager is configured to receive facility parking availability data from one or more of the first level managers in the locality managed by the second level manager. A first frequency of the first level managers receiving the sensor data from the vehicles is higher than a second frequency of the second level manager receiving the facility parking availability data from the first level managers.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 2A schematically depicts the hierarchical system for providing parking assistance of FIG. 1, according to one or more embodiments shown and described herein;

FIG. 2B depicts an exemplary map of a parking facility managed by a section manager of the system of FIG. 1;

FIG. 2C depicts an exemplary map of a locality managed by a locality manager of the system of FIG. 1;

FIG. 2D depicts an exemplary map of a region managed by a city manager of the system of FIG. 1;

DETAILED DESCRIPTION

Figure 1:
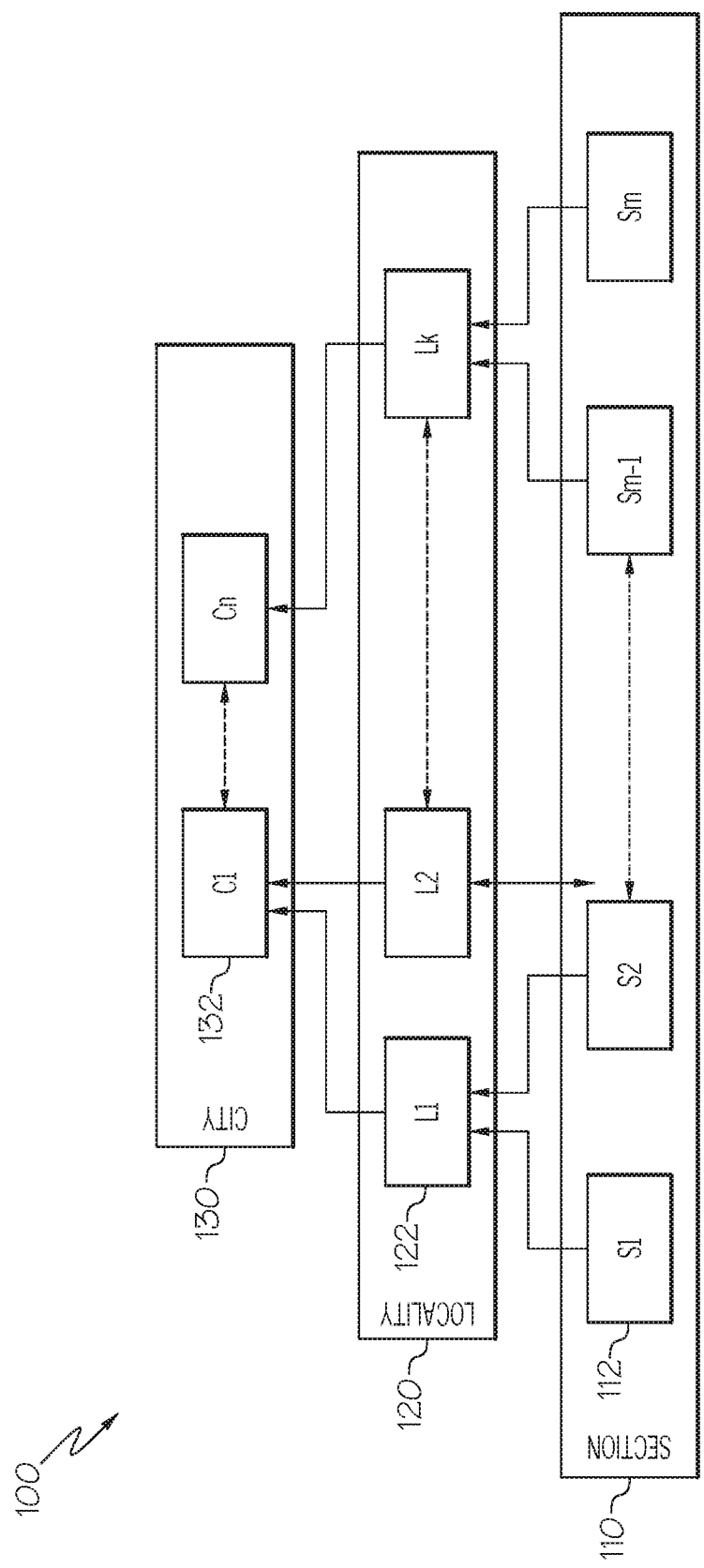
FIG. 1 schematically depicts a hierarchical system for providing parking assistance, according to one or more embodiments shown and described herein.

The embodiments disclosed herein include systems and methods for providing parking assistance to drivers. Parking assistance may be provided by various hierarchical level managers (e.g., section managers, locality managers, city managers, and the like) of a parking assistance system. A section manager may manage a single parking facility. A locality manager may manage a locality containing a plurality of section managers and may be in a higher hierarchical level than the section managers. A city manager may manage a region containing a plurality of locality managers and may be in a higher hierarchical level than the locality managers.

As one or more vehicles travel through a parking facility, the vehicles may have sensors that collect sensor data. The sensor data may be transmitted to a section manager managing the parking facility. The section manager may use the sensor data received from the vehicles to identify one or more available or unoccupied parking spaces in the facility. In some examples, the vehicles may locally analyze the sensor data to extract one or more features. The vehicles may then transmit these extracted features to the section manager. The section manager may then use the features received from the vehicles to identify one or more available parking spaces in the facility. Transmission of extracted features rather than raw sensor data may minimize communication overhead.

A vehicle may also request parking assistance from the section manager. In response to such a request, the section manager may predict which available parking spaces in the facility will be available at a time when the vehicle would arrive at the parking spaces. The section manager may then recommend an available parking space to the vehicle and guide the vehicle to that parking space. The section manager may transmit a total number of available parking spaces within the parking facility to a locality manager.

A locality manager may receive parking availability data from each section manager within the locality managed by the locality manager. Thus, the locality manager may maintain a record of the number of parking spaces available at each associated parking facility within the locality at any given time.

A vehicle may request parking assistance from the locality manager. In response to such a request, the locality manager may predict the number of available parking spaces there will be at each parking facility at a time that the vehicle would arrive at each parking facility. The locality manager may then recommend a parking facility to the vehicle and guide the vehicle to the facility. The locality manager may transmit a total number of available parking spaces within the locality to a city manager.

A city manager may receive parking availability data from each locality manager within the region managed by the city manager. Thus, the city manager may maintain a record of the number of parking spaces available within each associated locality within the region at any given time.

A vehicle may request parking assistance from the city manager. In response to such a request, the city manager may predict the number of available parking spaces there will be within each locality at a time that the vehicle would arrive at each locality. The city manager may then recommend a locality to the vehicle and guide the vehicle to the locality.

FIGS. 1 and 2A schematically depict a hierarchical system 100 for providing parking assistance to vehicles, according to one or more embodiments shown and described herein. In embodiments, the system 100 comprises multiple levels of managers. For example, as shown in FIG. 1, the system 100 comprises three levels: a first level 110, a second level 120, and a third level 130. In some embodiments, the system 100 may comprise more than or less than three levels. The hierarchical structure of the system 100 allows for an ease of scalability of the system, as explained below.

The first level 110 may include a plurality of first level managers, for example, section managers 112. The first level 110 may include any number of section managers 112 (e.g., in the example of FIG. 1, there are m section managers, S1 through Sm). Each section manager 112 manages parking assistance for a section. In the illustrated example, each section manager 112 manages parking assistance for a single parking facility (e.g., a parking garage) associated with the section manager 112. In other examples, one or more section managers 112 may manage parking assistance for other types of sections (e.g., multiple parking facilities, one or more floors of a parking garage, an area of street parking, or the like).

The section managers 112 may be edge computing devices or edge servers, such as road side units. Each section manager 112 may be an edge server located within or near the parking facility it is associated with. In one example, one or more of the section managers 112 may be hosted by a cloud server in a remote data center. In another example, one or more vehicles in a parking facility may be equipped with a vehicle-to-vehicle (V2V) communication module and the section manager 112 associated with the parking facility may be hosted by the vehicles in the parking facility. In this example, the vehicles may share collected data with each other over V2V communications to collaboratively perform the operation of the section manager 112 described below.

Each of the section managers 112 may receive sensor data from one or more vehicles within an associated parking facility. For example, FIG. 2A shows a portion 200 of a parking facility with vehicles 202 and 204 driving through the facility. The vehicles within the parking facility may transmit sensor data to the section manager 112.

The section manager 112 may use this received sensor data to identify available parking spaces within the associated parking facility and may maintain a record and/or a map of available parking spaces, as explained in further detail below. FIG. 2B shows an exemplary map 210 of available parking spaces within a parking facility that may be maintained by a section manager 112. The section managers 112 may also provide parking assistance for vehicles within an associated parking facility. Specifically, a section manager 112 may guide a vehicle to an available parking space within a parking facility, as explained in further detail below.

By limiting the scope of each section manager 112 to a single parking facility, the system 100 is able to provide fine-grained parking guidance to individual parking spaces. That is, each section manager 112 may be an edge computing device that only tracks parking availability for a single parking facility. This may allow the edge computing device to quickly respond to vehicle requests for parking assistance without needing to store parking availability data from multiple parking facilities. Because the section managers 112 track the availability of individual parking spaces within a parking facility, the data in the section managers 112 may be refreshed and updated frequently (e.g., every few seconds). This allows vehicles seeking parking assistance within a parking facility to receive accurate, near real-time guidance.

Referring back to FIG. 1, the second level 120 may include a plurality of second level managers, for example, locality managers 122. The second level 120 may include any number of locality managers 122 (e.g., in the example of FIG. 1, there are k locality managers, L through Lk). Each locality manager 122 manages parking assistance for a locality (e.g., a small geographic area), which contains one or more parking facilities or sections, each managed by a section manager 112. For example, FIG. 2C shows a map 220 of a locality, which may be managed by a locality manager 122, that contains parking facilities 222, 224, 226, and 228. The parking facilities 222, 224, 226, 228 may each be managed by a section manager 112. Any number of section managers 112 and associated parking facilities may be located within each locality managed by the locality managers 122 and each section manager 112 and its associated parking facility is located within one locality managed by one locality manager 122.

The section managers 112 within a locality may transmit parking availability data to the locality manager 122 that manages the locality. The parking availability data received by the locality manager 122 from the section managers 112 may comprise the number of parking spaces available within each parking facility managed by an associated section manager 112 at a given time. The locality manager 122 may use the received parking availability data to maintain a record of the number of available parking spaces in each parking facility within the associated locality at any given time. The locality manager 122 may use this record of parking availability data to guide vehicles to a less congested parking facility within the locality, as explained in further detail below.

Because each locality manager 122 only tracks the number of available spaces within parking facilities rather than a detailed record of every available space in each facility, the locality managers 122 may respond quickly to vehicle requests without the need to store an excessive amount of data. This helps improve scalability of the system 100.

The parking availability data in the locality managers 122 may also be refreshed and updated less frequently than the section managers 112 (e.g., every few minutes). This is because the locality managers 122 aggregate parking availability data across an entire locality. As such, small errors in the number of available parking spaces may only have a marginal impact on the performance of the system 100.

Referring back to FIG. 1, the third level 130 may include a plurality of third level managers, for example, city managers 132. The third level 130 may include any number of city managers 132 (e.g., in the example of FIG. 1, there are n city managers, C1 through Cn). Each city manager 132 manages parking assistance for a region (e.g., a large geographic area such as a city or city district), which contains one or more localities each managed by a locality manager 122. For example, FIG. 2D shows a map 230 of a region, which may be managed by a city manager 132, that contains localities 232, 234, 236, and 238. The localities 232, 234, 236, 238 may each be managed by a locality manager 122. Each of the localities 232, 234, 236, and 238 may contain one or more parking facilities, which may each be managed by a section manager 112.

The locality managers 122 within a region may transmit parking availability data to the city manager 132 that manages the region. The parking availability data received from the locality managers 122 may comprise the number of available parking spaces within the locality managed by each locality manager 122 at a given time (e.g., the aggregate number of parking spaces available in all of the parking facilities within the locality). The city manager 132 may use the received parking availability data to maintain a record of the number of available parking spaces within each locality within the associated region at any given time. The city manager 132 may use this record of parking availability data to guide vehicles to a less congested locality (e.g., a locality where drivers may utilize park-and-ride or public transportation to arrive at their final destination) within the region, as explained in further detail below.

Because each city manager 132 only tracks the number of available spaces within each locality in the region rather than the number of available parking spaces within each parking facility in the region, the city managers 132 may respond quickly to vehicle requests without the need to store an excessive amount of data. This helps improve scalability of the system 100.

The parking availability data in the city managers 132 may also be refreshed and updated less frequently than the locality managers 122 (e.g., every few hours). This is because the city managers 132 are aggregating parking availability data across an entire region. As such, the exact number of parking spaces available in each locality may not be needed to ensure satisfactory operation of the system 100 as long as a coarse estimate is available.

While the system 100 of FIG. 1 is shown as having three levels, the system 100 may be extended to additional levels if further scalability is desired. For example, a fourth level may include one or more fourth level managers that receive parking availability data from the city managers 132. The system 100 may continue to be extended to any number of hierarchical levels. In some examples, multiple managers may be hosted on the same server or computing device. For example, a section manager 112 and a locality manager 122 may be located on a single server. Alternatively, in another example, a locality manager 122 and city manager 132 may be located on a single server.

Figure 3:
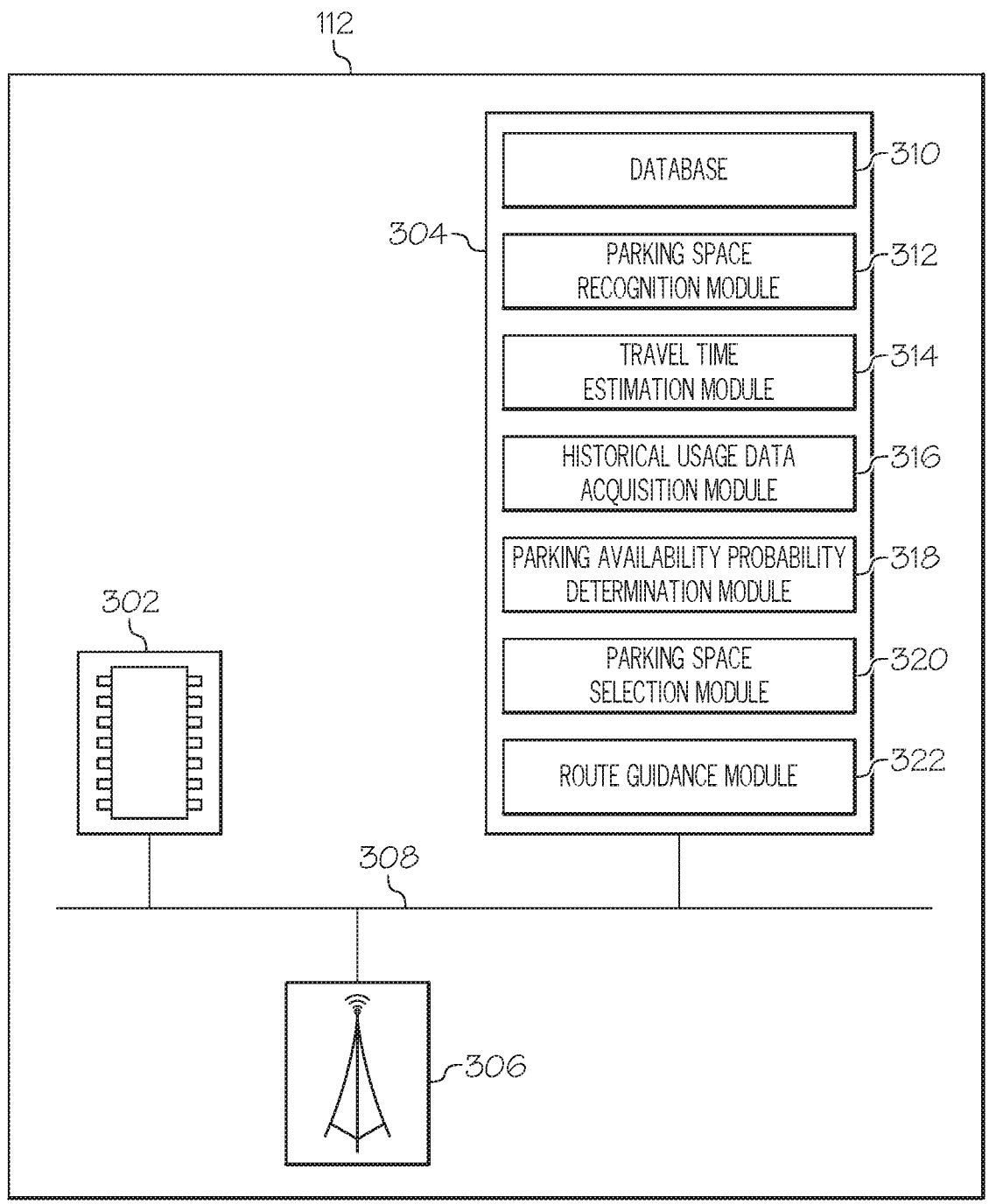
FIG. 3 depicts a schematic diagram of an exemplary section manager of the system of FIG. 1, according to one or more embodiments shown and described herein.

Referring now to FIG. 3, the section manager 112 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302. The communication path 308 provides signal interconnectivity between various modules of the section manager 112.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the section manager 112 may transmit and receive data to and from one or more vehicles within the parking facility associated with the section manager 112 and may transmit data to the locality manager 122 managing the locality in which the section manager 112 resides.

The one or more memory modules 304 include a database 310, a parking space recognition module 312, a travel time estimation module 314, a historical usage data acquisition module 316, a parking availability probability determination module 318, a parking space selection module 320, and a route guidance module 322. Each of the database 310, the parking space recognition module 312, the travel time estimation module 314, the historical usage data acquisition module 316, the parking availability probability determination module 318, the parking space selection module 320, and the route guidance module 322 may be a program module in the form of operating systems, application program modules, and other program modules stored in one or more memory modules 304. In some embodiments, the program module may be stored in a remote storage device that may communicate with the section manager 112. Such a program module may include, but is not limited to, routines, subroutines, programs, objects, components, data structures and the like for performing specific tasks or executing specific data types as will be described below.

The database 310 may temporarily store data received from one or more vehicles in the associated parking facility. The data received from the one or more vehicles may include sensor data and position data from the vehicles. The parking space recognition module 312 may use this information to identify available parking spaces, as explained in further detail below. In some examples, the section manager 112 may receive other data from the parking facility such as data from cameras or other sensors located in the parking facility. This data may also be temporarily stored in the database 310 and may be utilized by the parking space recognition module 312. Vehicles may also transmit requests for parking assistance to the section manager 112 along with associated information and this information may be temporarily stored in the database 310.

The database 310 may also permanently store a detailed map of the associated parking facility. The map may include locations of all parking spaces within the parking facility, such as the map 210 shown in FIG. 2B. The database 310 may also store information about each of the parking spaces in the associated parking facility, such as the size of the parking spaces and parking rates. This information may be periodically updated as parking rates and other information about the parking spaces change.

Referring still to FIG. 3, the parking space recognition module 312 may recognize available parking spaces within the parking facility using techniques described herein. As one or more vehicles drive through a parking facility, the vehicles may have sensors collecting data about the driving environment. The sensors on vehicles may include, but are not limited to, LiDAR sensors, RADAR sensors, optical sensors (e.g., cameras), laser sensors, proximity sensors, location sensors (e.g., GPS modules), and the like.

As the sensor data is collected by vehicles in the parking facility, the sensor data may be transmitted to the section manager 112 associated with the parking facility and the parking space recognition module 312 may analyze this sensor data to identify available parking spaces. For example, as a vehicle is approaching an available parking space, an external camera on the vehicle may capture an image showing that the parking space is vacant. In another example, as a vehicle passes an occupied parking space, a proximity sensor may detect the vehicle in the parking space, whereas when the vehicle passes an empty parking space, the proximity sensor may not detect a vehicle, indicating that the space is available.

In addition to sensor data, vehicles in the parking facility may also transmit their position to the section manager 112 (e.g., based on GPS data received by the vehicles). The parking space recognition module 312 may use the received sensor data in conjunction with the position data and a map of the parking facility to identify available parking spaces in the parking facility. The more vehicles that are driving in the parking facility and transmitting sensor data to the section manager 112, the more comprehensive and accurate the parking space recognition module 312 may be in identifying available parking spaces. In some examples, the section manager 112 may also receive data from other sensors or cameras in the parking facility (e.g., images from security cameras or designated parking space monitoring sensors). In these examples, the parking space recognition module 312 may utilize this data either alone or in conjunction with sensor data received from vehicles to identify available parking spaces in the parking facility.

As additional data is received by the section manager 112, the parking space recognition module 312 may continually update the locations of available parking spaces within the parking facility and may store this information in the database 310. As explained above, the data in the section manager 112 may be updated frequently (e.g., every few seconds) in order to maintain an accurate and timely record of available parking spaces in the parking facility.

In addition to maintaining a record of the locations of available parking spaces in an associated parking facility, the section manager 112 may also receive requests to provide parking assistance to vehicles at or approaching the parking facility. The section manager 112 may provide parking assistance using the techniques described herein.

Figure 13:
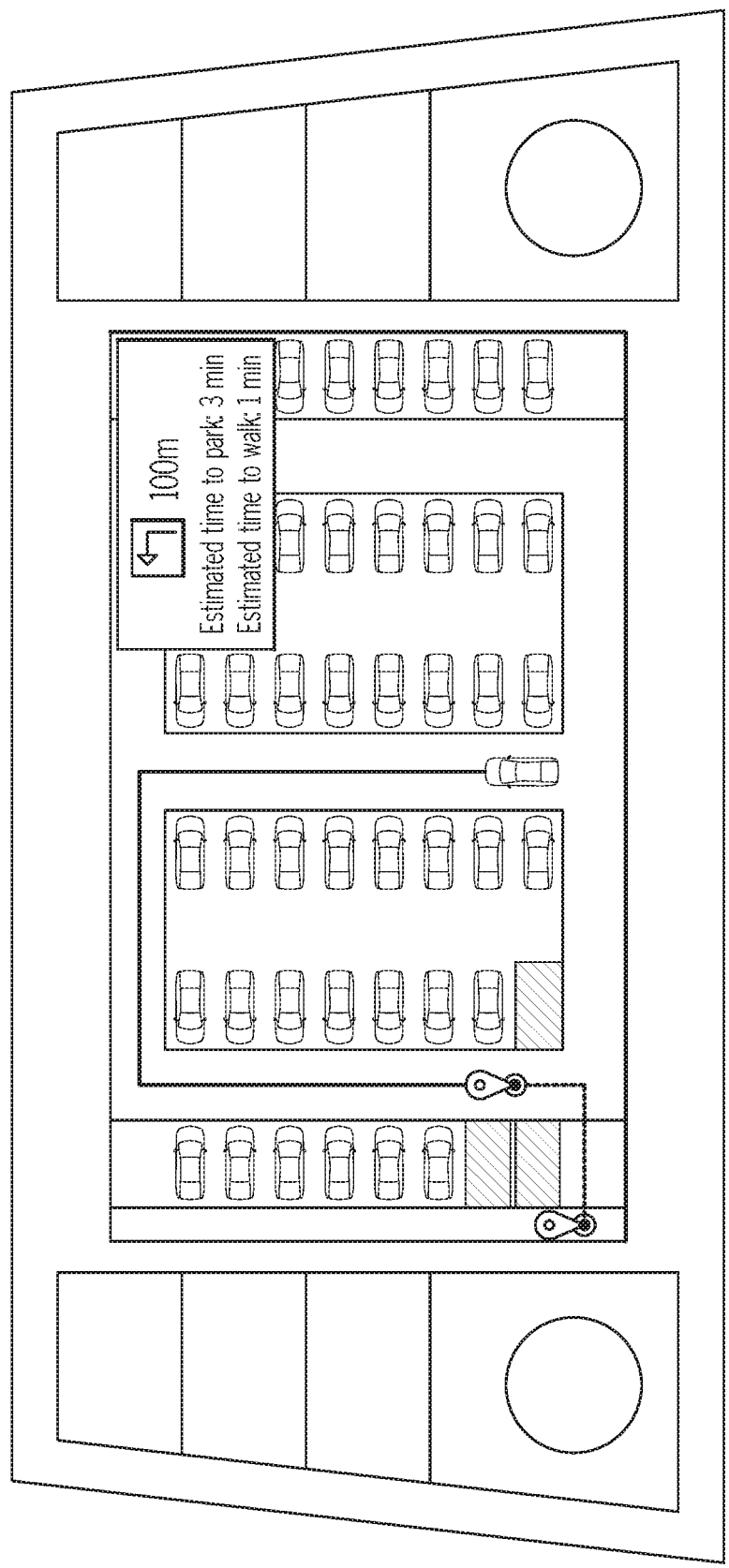
FIG. 13 depicts an exemplary parking route guidance that may be provided by the section manager, according to one or more embodiments shown and described herein.

The travel time estimation module 314 may estimate the travel time for a vehicle requesting parking assistance (e.g., a requesting vehicle) to arrive at an available parking space. When the section manager 112 receives a request for parking assistance from a requesting vehicle, the section manager 112 also receives a location of the requesting vehicle. Thus, the travel time estimation module 314 may estimate the time it will take the requesting vehicle to arrive at an available parking space based on the location of the requesting vehicle, the location of the parking space, and the map of the parking facility. In some examples, the travel time estimation module 314 may estimate the travel time based on the distance between the requesting vehicle and the available parking space. In other examples, the route guidance module 322 may determine an optimal route between the location of the requesting vehicle and the parking space based on the map of the parking facility (an example route between a vehicle and an available parking space is shown in FIG. 13). The travel time estimation module 314 may then estimate the travel time based on the distance of the determined route.

In some examples, the travel time estimation module 314 may determine an estimated travel time between the requesting vehicle and each available parking space in the parking facility. In other examples, the travel time estimation module 314 may determine an estimated travel time between the requesting vehicle and only some of the available parking spaces in the parking facility (e.g., in a multi-story parking garage, the travel time estimation module 314 may only consider the available parking spaces on the same floor as the vehicle).

Once the travel time estimation module 314 determines estimated travel times to a number of available parking spaces, the section manager 112 may determine which available parking space is closest (e.g., in distance or travel time) to the requesting vehicle. However, it is possible that even though a parking space is available at the time the requesting vehicle requests parking assistance, the parking space may no longer be available by the time the requesting vehicle arrives at the space. Moreover, if the section manager 112 guides the requesting vehicle to a parking space that is no longer available by the time the requesting vehicle arrives, the requesting vehicle will have to find another parking space and the parking assistance will have failed. Accordingly, it may be desirable for the section manager 112 not to simply guide the requesting vehicle to the closest parking space. Instead, the section manager 112 may predict the likelihood that available parking spaces will still be available when the requesting vehicle arrives, as described below.

The historical usage data acquisition module 316 may acquire historical usage data for the parking facility and the parking spaces therein. This may include data regarding which parking spaces in the parking facility were occupied and which parking spaces were available (e.g., parking occupancy data) at various times. It may include parking occupancy data for different days of the week or different times of day. It may include parking occupancy data for holidays or other special occasions. It may include data correlating the availability of different parking spaces (e.g., when a first parking space tends to be available, a second parking space also tends to be available). The historical usage data may also include variations in parking availability over time. For example, certain configurations of available parking spaces at one time may tend to result in certain other configurations of available parking spaces a short time later. In some examples, the historical usage data acquisition module 316 may acquire historical usage data that is stored in the database 310. In other examples, the historical usage data acquisition module 316 may acquire historical usage data from another server or computing device associated with the parking facility. As this historical usage data is acquired, it may then be stored in the database 310.

The parking availability probability determination module 318 may determine a probability that an available parking space will still be available at a time when the requesting vehicle arrives at the parking space. This probability determination may be based on the estimated travel time to the available parking space determined by the travel time estimation module 314, and the historical usage data acquired by the historical usage data acquisition module 316.

In the illustrated example, the parking availability probability determination module 318 uses a Markov model to predict a probability that a parking space will be available at a time in the future. The Markov model used by the parking availability probability determination module 318 may comprise a Markov chain that describes a series of states and a probability of transitioning from any given state at a first time t to any other state at a second time t+1 (e.g., five seconds later). Each state of the Markov chain may comprise occupancy data of the parking facility (e.g., which parking spaces of the facility are occupied and which parking spaces are available).

The parking availability probability determination module 318 may build the Markov chain based on the historical data acquired by the historical usage data acquisition module 316 and may store the parameters of the Markov chain in the database 310. As additional data is collected by the historical usage data acquisition module 316, the parking availability probability determination module may update the parameters of the Markov chain stored in the database 310.

Once the Markov chain is assembled, the parking availability probability determination module 318 may input the current state of the parking facility (e.g., which parking spaces are available) into the Markov model and may propagate the Markov chain forward in time a duration equal to the estimated travel time for the requesting vehicle to arrive at an available parking space. The resulting state of the Markov model will provide a probability that a parking space will be available when the requesting vehicle arrives at the parking space.

The parking availability probability determination module 318 may use the Markov model to estimate the probability that each of the available parking spaces will be available when the requesting vehicle would arrive at each parking space based on the estimated travel time to each parking space. In other examples, methodologies other than a Markov model may be used by the parking availability probability determination module 318 to determine probabilities of parking spaces remaining available at a time when a requesting vehicle would arrive.

The parking space selection module 320 selects an available parking space to recommend to the requesting vehicle. The parking space selection module 320 may use a variety of factors to determine which available parking space to recommend to the requesting vehicle. These factors may include the estimated travel time to the parking space and the probability that the parking space will still be available when the requesting vehicle arrives at the space, among other factors.

In one example, the parking space selection module 320 may recommend the available parking space that has the shortest estimated travel time for the requesting vehicle to arrive. In another example, the parking space selection module 320 may recommend the available parking space that has the highest probability of remaining available when the requesting vehicle arrives. In another example, the parking space selection module 320 may recommend the available parking space that has the shortest estimated travel time for the requesting vehicle to arrive among available parking that have a probability of remaining available above a predetermined threshold.

In some examples, the requesting vehicle may transmit a final destination to the section manager 112 (e.g., the destination that the driver of the vehicle will walk to after parking) and the parking space selection module 320 may select an available parking space based on the distance between the available parking and the received final destination (e.g., selecting a parking space that is close to the final destination). In some examples, the requesting vehicle may transmit one or more preferences to the section manager 112 (e.g., the size of the requesting vehicle, the maximum parking fee the driver is willing to pay, etc.). The parking space selection module 320 may then select a parking space based on these received preferences. For example, the parking space selection module 320 may avoid recommending a parking space that would be difficult for the requesting vehicle to park in based on the size of the vehicle and the size of the parking space. In another example, the parking space selection module 320 may avoid recommending a parking space that has a parking fee higher than what the driver of the requesting vehicle is willing to pay.

The route guidance module 322 may determine an optimal route between the location of the requesting vehicle and the location of the parking space selected by the parking space selection module 320. The route guidance module 322 may determine the optimal route based on the map of the parking facility stored in the database 310. FIG. 13 shows an exemplary route between a vehicle and an available parking space in a parking facility. In some examples where a parking facility has multiple entrances, the route guidance module 322 may recommend the entrance to the parking facility that minimizes the expected travel time to the selected parking space. After the route guidance module 322 determines the optimal route, the section manager 112 may transmit the route to the requesting vehicle. The requesting vehicle may then follow the determined route to arrive and park at the available parking space.

The section manager 112 may also periodically transmit the number of available parking spaces within the parking facility to the locality manager 122. In one example, the section manager 112 may transmit the number of available parking spaces to the locality manager 122 whenever a designated time has elapsed since the last transmission. In another example, the section manager 112 may transmit the number of available parking spaces whenever the number of available parking spaces has changed more than a threshold amount since the last transmission. In another example, the section manager 112 may transmit the number of available parking spaces whenever the number of available parking spaces becomes greater than a predetermined threshold or becomes less than a predetermined threshold. The transmitted number of available parking spaces within the parking facility may be received by the locality manager 122 and utilized as described below in connection with FIG. 4.

Figure 4:
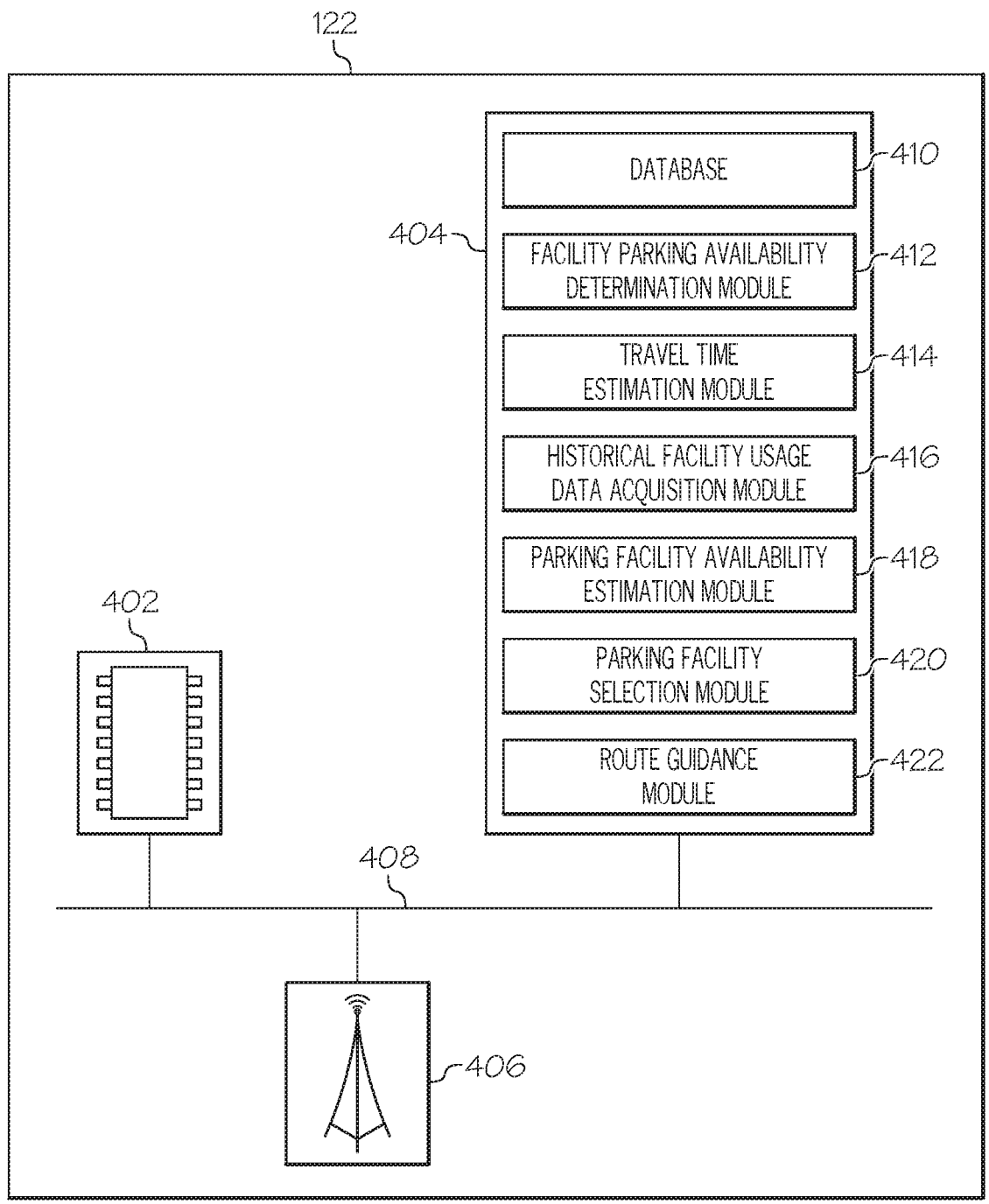
FIG. 4 depicts a schematic diagram of an exemplary locality manager of the system of FIG. 1, according to one or more embodiments shown and described herein.

Referring now to FIG. 4, the locality manager 122 is described. As explained above, the locality manager 122 may manage parking assistance for a locality containing one or more parking facilities managed by section managers 112. In one example, the locality manager 122 may be an edge server or other server or computing device located in or adjacent to the associated locality. In other examples, the locality manager 122 may be a cloud server or other distributed computing device.

The locality manager 122 comprises one or more processors 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402. The communication path 408 provides signal interconnectivity between various modules of the locality manager 122.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 406 includes hardware configured to operate in accordance with the Bluetooth® wireless communication protocol. The network interface hardware 406 of the locality manager 122 may receive data from the one or more section managers 112 in the locality managed by the locality manager 122 and may transmit data to the city manager 132 that manages the region in which the locality manager 122 resides. In addition, the network interface hardware 406 may receive requests for parking assistance from vehicles within the associated locality.

The one or more memory modules 404 include a database 410, a facility parking availability determination module 412, a travel time estimation module 414, a historical facility usage data acquisition module 416, a parking facility availability estimation module 418, a parking facility selection module 420, and a route guidance module 422. Each of the database 410, the facility parking availability determination module 412, the travel time estimation module 414, the historical facility usage data acquisition module 416, the parking facility availability estimation module 418, the parking facility selection module 420, and the route guidance module 422 may be a program module in the form of operating systems, application program modules, and other program modules stored in one or more memory modules 404. In some embodiments, the program module may be stored in a remote storage device that may communicate with the locality manager 122. Such a program module may include, but is not limited to, routines, subroutines, programs, objects, components, data structures and the like for performing specific tasks or executing specific data types as will be described below.

The database 410 may temporarily store data received from one or more section managers 112 in the locality. This data may include parking availability data regarding the parking facilities associated with the section managers 112 (e.g., the number of available parking spaces in each such parking facility). The facility parking availability determination module 412 may use this information to determine parking availability in the locality associated with the locality manager 122, as explained in further detail below. The locality manager 122 may also receive requests for parking assistance from vehicles in the locality along with associated information and this information may be stored in the database 410 as well.

The database 410 may also permanently store a map of the associated locality. The map may include locations of all of the parking facilities within the locality, such as the map 220 shown in FIG. 2C. The database 410 may also store information about each of the parking facilities in the locality, such as parking rates. This information may be periodically updated as parking rates and other information about the parking facilities change.

Referring still to FIG. 4, the facility parking availability determination module 412 may determine the number of parking spaces that are available at each parking facility within the locality. The facility parking availability determination module 412 may make this determination based on the parking availability data received from the section managers 112 that manage the parking facilities within the locality. This parking availability data may be periodically updated as additional data is received from the section managers 112. However, the data may be updated less frequently than the section managers 112 update parking availability maps of the parking facilities. This is because the total number of parking spaces available in a parking facility is less sensitive to minor variations than the availability of specific parking spaces in the facility. Thus, while the section managers 112 may update parking availability maps every few seconds, the locality manager 122 may only update parking availability numbers every few minutes, for example. The frequency with which the section managers 112 transmit parking availability data to the locality manager 122 may be adjusted accordingly.

In addition to maintaining a record of the number of available parking spaces in each of the parking facilities in the locality, the locality manager 122 may also receive requests to provide parking assistance to vehicles within or approaching the locality. The locality manager 122 may provide parking assistance using the techniques described herein.

The travel time estimation module 414 may estimate the travel time for a vehicle requesting parking assistance (e.g., a requesting vehicle) to arrive at a parking facility within the locality. When the locality manager 122 receives a request for parking assistance from a requesting vehicle, the locality manager 122 also receives a location of the requesting vehicle. Thus, the travel time estimation module 414 may estimate the time it will take the requesting vehicle to arrive at a parking facility based on the location of the requesting vehicle, the location of the parking facility, and the map of the locality. In some examples, the travel time estimation module 414 may estimate the travel time based on the distance between the requesting vehicle and the parking facility. In other examples, the route guidance module 422 may determine an optimal route between the location of the requesting vehicle and the parking facility based on the map of the locality. The travel time estimation module 414 may then estimate the travel time based on the distance of the determined route.

In some examples, the travel time estimation module 414 may determine an estimated travel time between the requesting vehicle and each parking facility in the locality. In other examples, the travel time estimation module 414 may determine an estimated travel time between the requesting vehicle and only some of the parking facilities in the locality (e.g., only the parking facilities within a threshold distance from the requesting vehicle, or only the parking facilities that meet certain preferences received from the requesting vehicle).

Once the travel time estimation module 414 determines estimated travel times to a number of parking facilities in the locality, the locality manager 122 may determine which parking facility is closest (e.g., in distance or travel time) to the requesting vehicle. However, it is possible that even if a parking facility has available parking spaces at the time the requesting vehicle requests parking assistance, the parking facility may no longer have any available parking spaces by the time the requesting vehicle arrives at the parking facility. Moreover, if the locality manager 122 guides the requesting vehicle to a parking facility that does not have any available parking spaces when the requesting vehicle arrives, the requesting vehicle will have to park at another facility and the parking assistance will have failed. Accordingly, the locality manager 122 may predict the number of parking spaces that will be available in a parking facility when the requesting vehicle arrives, as described below, rather than simply recommending the closest parking facility with available parking.

The historical facility usage data acquisition module 416 may acquire historical usage data for the parking facilities within the locality. This may include the number of available parking spaces in each parking facility at different times in the past. The historical usage data may also include variations in the number of available parking spaces in each parking facility over time. In some examples, the historical facility usage data acquisition module 416 may acquire historical usage data that is stored in the database 410. In other examples, the historical facility usage data acquisition module 416 may acquire historical usage data from another server or computing device associated with the parking facilities in the locality. Such acquired data may then be stored in the database 410.

The parking facility availability estimation module 418 may estimate the number of parking spaces that will be available in a parking facility at a time when the requesting vehicle arrives at the parking facility. This estimation may be based on the estimated travel time to the parking facility determined by the travel time estimation module 414, and the historical usage data acquired by the historical facility usage data acquisition module 416.

In the illustrated example, the parking facility availability estimation module 418 uses a Markov model to estimate the number of parking spaces that will be available in a parking facility at a time in the future. The Markov model used by the parking facility availability estimation module 418 may comprise a Markov chain that describes a series of states and a probability of transitioning from any given state at a first time t to any other state at a second time t+1 (e.g., five minutes later). Each state of the Markov chain may comprise a number of parking spaces available in a parking facility. The states of the Markov chain may also comprise information about the time of day or the day of the week. The parking facility availability estimation module 418 may build the Markov chain based on the historical data acquired by the historical facility usage data acquisition module 416 and may store the parameters of the Markov chain in the database 410. Each parking facility in the locality maybe associated with a different Markov model. In other examples, the parking facility availability estimation module 418 may utilize methodologies other than a Markov model.

Once the Markov chain is assembled, the parking facility availability estimation module 418 may input the current number of parking spaces available in each parking facility in the locality into the Markov model and may propagate the Markov chain forward in time a duration equal to the estimated travel time for the requesting vehicle to arrive at each of the parking facilities. The resulting state of the Markov model will provide an estimated number of parking spaces available in each parking facility in the locality when the requesting vehicle would arrive at each facility.

The parking facility selection module 420 may select a parking facility to recommend to the requesting vehicle to park. The parking facility selection module 420 may use a variety of factors to determine which locality to recommend to the requesting vehicle. These factors may include the estimated travel time to the parking facility and the estimated number of parking spaces that will be available when the requesting vehicle arrives at the parking facility, among other factors.

In one example, the parking facility selection module 420 may recommend the parking facility that has the shortest estimated travel time for the requesting vehicle to arrive. In another example, the parking facility selection module 420 may recommend the parking facility that has the most estimated number of available parking spaces when the requesting vehicle arrives. In another example, the parking facility selection module 420 may recommend the parking facility that has the shortest estimated travel time for the requesting vehicle to arrive among parking facilities that have an estimated number of available parking spaces above a predetermined threshold. In some examples, the parking facility selection module 420 may select a parking facility based on the distance between the parking facility and the final destination of the driver of the requesting vehicle. In some examples, the parking facility selection module 420 may select the parking facility based on preferences received from the requesting vehicle, such as parking rates.

The route guidance module 422 may determine an optimal route between the location of the requesting vehicle and the location of the parking facility selected by the parking facility selection module 420. The route guidance module 422 may determine the optimal route based on the map of the locality stored in the database 410. After the route guidance module 422 determines the optimal route, the locality manager 122 may transmit the route to the requesting vehicle. The requesting vehicle may then follow the determined route to arrive at the selected parking facility. If the estimated parking availability of the selected parking facility changes while the vehicle is in transit to the selected parking facility, the locality manager 122 may select a new parking facility and may transmit, to the requesting vehicle, a revised route to the newly selected parking facility. Once the requesting vehicle arrives at the selected parking facility, the requesting vehicle may transmit a request to the section manager 112 associated with the parking facility for assistance in finding a particular parking space in the parking facility.

The locality manager 122 may also periodically transmit the aggregate number of available parking spaces in all the parking facilities within the locality to the city manager 132. In one example, the locality manager 122 may transmit the number of available parking spaces in the locality to the city manager 132 when a designated time has elapsed since the last such transmission. In another example, the locality manager 122 may transmit the number of available parking spaces to the city manager 132 when the number of available parking spaces has changed by more than a threshold amount since the last transmission. In another example, the locality manager 122 may transmit the number of available parking spaces to the city manager 132 when the number of available parking spaces becomes greater than a threshold or lower than a threshold. The city manager 132 may receive the number of available parking spaces in the locality and utilize the received data as described below, in connection with FIG. 5.

Figure 5:
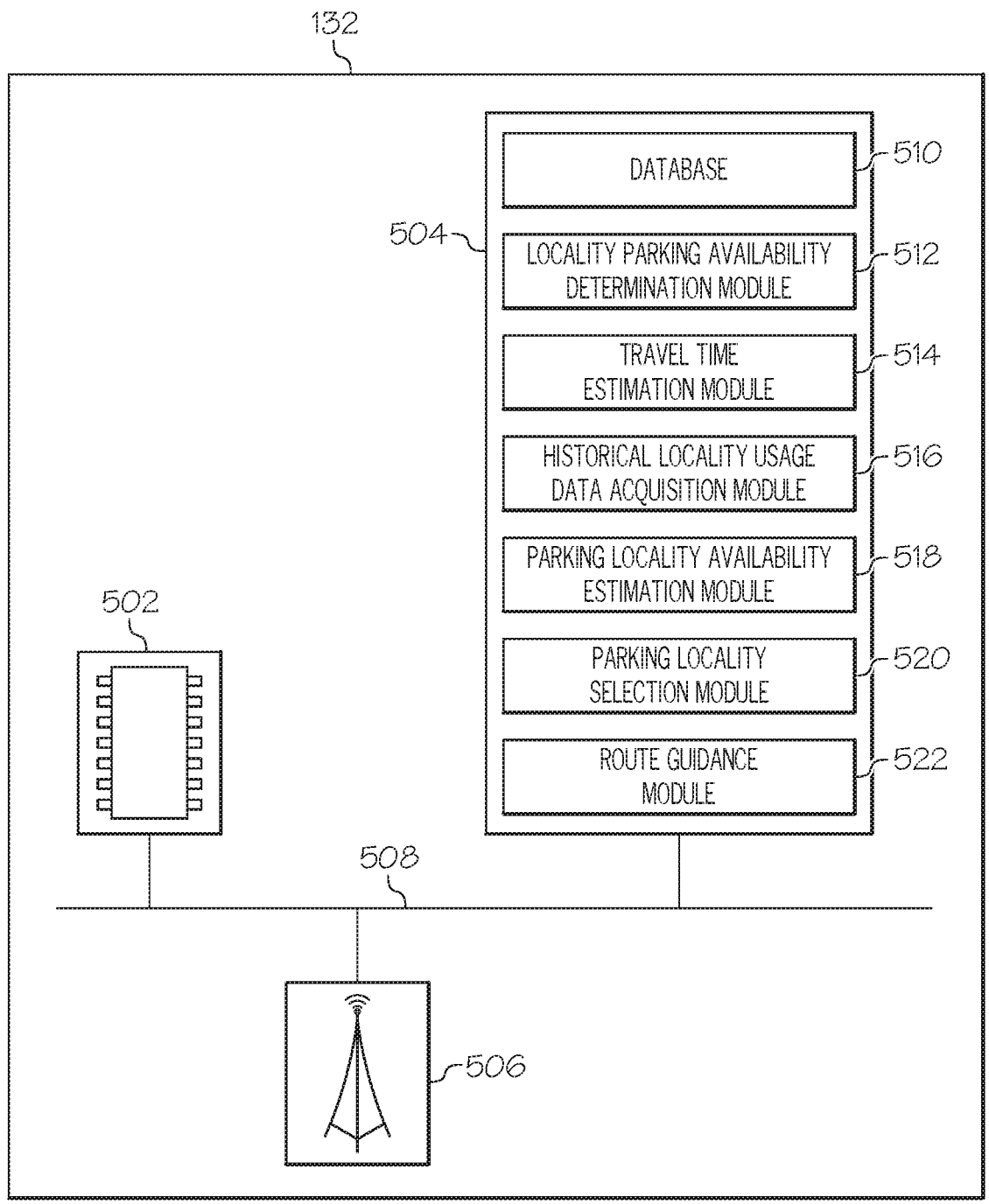
FIG. 5 depicts a schematic diagram of an exemplary city manager of the system of FIG. 1, according to one or more embodiments shown and described herein.

Referring now to FIG. 5, the city manager 132 is described. As explained above, the city manager 132 may manage parking assistance for a region containing one or more locality managers 122. The city manager 132 may be an edge server or other server or computing device located in or adjacent to the associated region. In some examples, the city manager 132 may be a cloud server or other distributed computing device.

The city manager 132 comprises one or more processors 502, one or more memory modules 504, network interface hardware 506, and a communication path 508. The one or more processors 502 may be a controller, an integrated circuit, a microchip, a computer, or any other computing device. The one or more memory modules 504 may comprise RAM, ROM, flash memories, hard drives, or any device capable of storing machine readable and executable instructions such that the machine readable and executable instructions can be accessed by the one or more processors 502. The communication path 508 provides signal interconnectivity between various modules of the city manager 132.

The network interface hardware 506 can be communicatively coupled to the communication path 508 and can be any device capable of transmitting and/or receiving data via a network. Accordingly, the network interface hardware 506 can include a communication transceiver for sending and/or receiving any wired or wireless communication. For example, the network interface hardware 506 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 506 includes hardware configured to operate in accordance with the Bluetooth® wireless communication protocol. The network interface hardware 506 of the city manager 132 may receive data from the one or more locality managers 122 in the region managed by the city manager 132. In examples where there is a fourth level of managers above the city manager 132, the network interface hardware 506 may transmit data to the fourth level manager that manages the geographic area in which the city manager 132 resides. In addition, the network interface hardware 506 may receive requests for parking assistance from vehicles within the associated region.

The one or more memory modules 504 include a database 510, a locality parking availability determination module 512, a travel time estimation module 514, a historical locality usage data acquisition module 516, a parking locality availability estimation module 518, a parking locality selection module 520, and a route guidance module 522. Each of the database 510, the locality parking availability determination module 512, the travel time estimation module 514, the historical locality usage data acquisition module 516, the parking locality availability estimation module 518, the parking locality selection module 520, and the route guidance module 522 may be a program module in the form of operating systems, application program modules, and other program modules stored in one or more memory modules 504. In some embodiments, the program module may be stored in a remote storage device that may communicate with the city manager 132. Such a program module may include, but is not limited to, routines, subroutines, programs, objects, components, data structures and the like for performing specific tasks or executing specific data types as will be described below.

The database 510 may temporarily store data received from one or more locality managers 122 in the region managed by the city manager 132. This data may include parking availability data regarding the localities associated with the locality managers 122 (e.g., the number of available parking spaces in each such locality). The locality parking availability determination module 512 may use this information to determine parking availability in the region associated with the city manager 132, as explained in further detail below. The city manager 132 may also receive requests for parking assistance from vehicles in the region along with associated information and this information may be stored in the database 510.

The database 510 may also permanently store a map of the associated region. The map may include locations of all of the localities within the region, such as the map 230 shown in FIG. 2D. The database 510 may also store information about each of the localities in the region, such as general information about parking in the locality. This information may be periodically updated as information changes.

Referring still to FIG. 5, the locality parking availability determination module 512 may determine the number parking spaces that are available in each locality within the region. The locality parking availability determination module 512 may make this determination based on the parking availability data received from the locality managers 122 that manage the localities within the region. This parking availability data may be periodically updated as additional data is received from the locality managers 122. However, the data may be updated less frequently than the locality managers 122 update parking availability data for the parking facilities in the associated localities. This is because the region managed by the city manager 132 covers a large geographic area and errors in the number of parking spaces available in a locality at any given time may be less important than errors in the number of parking spaces available in a parking facility. Thus, while the locality managers 122 may update parking availability data every few minutes, the city manager 132 may only update parking availability data every hour, for example. The frequency with which the locality managers 122 transmit parking availability data to the city manager 132 may be adjusted accordingly.

In addition to maintaining a record of the number of available parking spaces in each locality within the region, the city manager 132 may also receive requests to provide parking assistance to vehicles within or approaching the region. The city manager 132 may provide parking assistance using the techniques described herein.

The travel time estimation module 514 may estimate the travel time for a vehicle requesting parking assistance (e.g., a requesting vehicle) to arrive at a locality within the region. When the city manager 132 receives a request for parking assistance from a requesting vehicle, the city manager 132 also receives a location of the requesting vehicle. Thus, the travel time estimation module 514 may estimate the time it will take the requesting vehicle to arrive at a locality based on the location of the requesting vehicle, the location of the locality, and the map of the region. In some examples, the travel time estimation module 514 may estimate the travel time based on the distance between the requesting vehicle and the locality. In other examples, the route guidance module 522 may determine an optimal route between the location of the requesting vehicle and the locality based on the map of the region. The travel time estimation module 514 may then estimate the travel time based on the distance of the determined route.

In some examples, the travel time estimation module 514 may determine an estimated travel time between the requesting vehicle and each locality within the region. In other examples, the travel time estimation module 514 may determine an estimated travel time between the requesting vehicle and only some of the localities within the region (e.g., only the localities within a threshold distance from the requesting vehicle).

Once the travel time estimation module 514 determines estimated travel times to a number of localities in the region, the city manager 132 may determine which parking facility is closest (e.g., in distance or travel time) to the requesting vehicle. The city manager 132 may also predict the number of parking spaces that will be available in one or more of the localities when the requesting vehicle arrives, as described below. A driver may generally desire to park in a locality that is close to their final destination so that significant walking to the final destination is not required. Thus, it may not be desirable for the city manager 132 to recommend an alternative locality for the driver to park. However, if parking is significantly easier to find in an alternative locality, and if there are options to get from the locality to the final destination (e.g., public transportation, taxis, ride-share), it may be desirable for the city manager 132 to recommend an alternative locality for parking, as described below.

The historical locality usage data acquisition module 516 may acquire historical usage data for the localities within the region. This may include the number of available parking spaces in each locality at different times in the past. The historical usage data may also include variations in the number of available parking spaces in each locality over time. In some examples, the historical locality usage data acquisition module 516 may acquire historical usage data that is stored in the database 510. In other examples, the historical locality usage data acquisition module 516 may acquire historical usage data from another server or computing device associated with the localities in the region. In these examples, the acquired historical usage data may then be stored in the database 510.

The parking locality availability estimation module 518 may estimate the number of parking spaces that will be available in a locality at a time when the requesting vehicle arrives at the locality. This estimation may be based on the estimated travel time to the locality determined by the travel time estimation module 514 and the historical usage data acquired by the historical locality usage data acquisition module 516.

In the illustrated example, the parking locality availability estimation module 518 uses a Markov model to estimate the number of parking spaces that will be available in a locality at a time in the future. The Markov model used by the parking locality availability estimation module 518 may comprise a Markov chain that describes a series of states and a probability of transitioning from any given state at a first time t to any other state at a second time t+1 (e.g., twenty minutes later). Each state of the Markov chain may comprise a number of parking spaces available within a locality in the region. The states of the Markov chain may also comprise information about the time of day or the day of the week. The parking locality availability estimation module 518 may build the Markov chain based on the historical data acquired by the historical locality usage data acquisition module 516 and may store the parameters of the Markov chain in the database 510. Each locality in the region may be associated with a different Markov model. In other examples, the parking locality availability estimation module 518 may use methodologies other than a Markov model.

Once the Markov chain is assembled, the parking locality availability estimation module 518 may input the current number of parking spaces available in each locality in the region into the Markov model and may propagate the Markov chain forward in time a duration equal to the estimated travel time for the requesting vehicle to arrive at each of the localities. The resulting state of the Markov model will provide an estimated number of parking spaces available in each locality when the requesting vehicle would arrive at each locality.

The parking locality selection module 520 selects a locality to recommend to the requesting vehicle. The parking locality selection module 520 may use a variety of factors to determine which parking facility to recommend to the requesting vehicle. These factors may include the estimated travel time to the locality and the estimated number of parking spaces that will be available when the requesting vehicle arrives at the locality, among other factors.

In one example, the parking locality selection module 520 may recommend the locality that has the shortest estimated travel time for the requesting vehicle to arrive. In another example, the parking locality selection module 520 may recommend the locality that has the most estimated number of available parking spaces when the requesting vehicle arrives. In another example, the parking locality selection module 520 may recommend the locality that has the shortest estimated travel time for the requesting vehicle to arrive among localities that have an estimated number of available parking spaces above a predetermined threshold. In some examples, the parking locality selection module 520 may select a locality based on the distance between the locality and the final destination of the driver of the requesting vehicle. In some examples, the parking locality selection module 520 may select the locality based on preferences received from the requesting vehicle, such as the availability of public transportation within the locality.

The route guidance module 522 may determine an optimal route between the location of the requesting vehicle and the location of the locality selected by the parking locality selection module 520. The route guidance module 522 may determine the optimal route based on the map of the region stored in the database 510. After the route guidance module 522 determines the optimal route, the city manager 132 may transmit the route to the requesting vehicle. The requesting vehicle may then follow the determined route to arrive at the selected locality. If the estimated parking availability of the selected locality changes while the vehicle is in transit to the selected locality, the city manager 132 may select a new locality and may transmit, to the requesting vehicle, a revised route to the newly selected locality. Once the requesting vehicle arrives at the selected locality, the requesting vehicle may transmit a request to the locality manager 122 associated with the locality for assistance in finding a parking facility within the locality.

By utilizing the hierarchical structure of level managers described above, the operation of the system 100 may be balanced across the various manager components. The load on any manager component is generally proportional to the frequency of refreshing parking availability information multiplied by the number of vehicles or lower-level managers from which it receives data. Thus, since the section managers 112 manage a small geographic area with a high refresh rate, the locality managers 122 manage a larger area with a lower refresh rate, and the city managers 132 manage the largest area with the lowest refresh rate, the load on each manager is relatively balanced. This helps to improve the scalability of the system 100.

Figure 6:
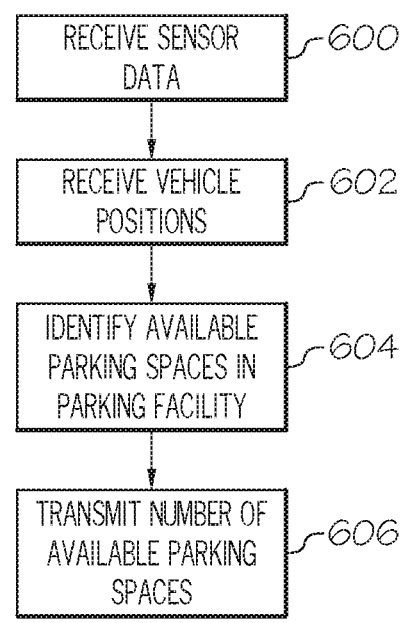
FIG. 6 depicts a flowchart for a method that may be implemented by the section manager to identify available parking spaces in a parking facility, according to one or more embodiments shown and described herein.

FIG. 6 depicts a flowchart for a method that may be implemented by the section manager 112 to identify available parking spaces in the parking facility managed by the section manager 112. At step 600, the section manager 112 receives sensor data from one or more vehicles in the parking facility via the network interface hardware 306. The section manager 112 may store the received sensor data in the database 310.

At step 602, the section manager 112 receives position data from the one or more vehicles in the parking facility via the network interface hardware 306. The position data of the vehicles corresponds to the positions of each of the one or more vehicles when the sensor data is collected. The section manager 112 may store the received position data in the database 310.

At step 604, the parking space recognition module 312 identifies available parking spaces in the parking facility based on the sensor data and position data received from the vehicles in the parking facility and a map of the parking facility stored in the database 310. At step 606, the section manager 112 transmits, via the network interface hardware 306, the total number of available parking spaces in the parking facility to the locality manager 122 that manages the locality in which the parking facility resides.

Figure 7:
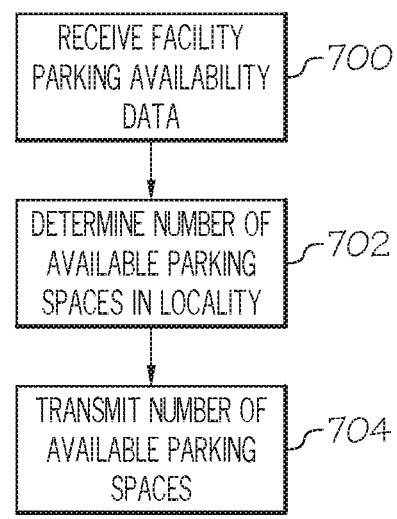
FIG. 7 depicts a flowchart for a method that may be implemented by the locality manager to determine the number of parking spaces available in each parking facility in a locality, according to one or more embodiments shown and described herein.

FIG. 7 depicts a flowchart for a method that may be implemented by the locality manager 122 to determine the number of parking spaces available in each parking facility in the locality managed by the locality manager 122. At step 700, the locality manager 122 receives, via the network interface hardware 406, parking availability data from each of the section managers 112 that manage parking facilities in the locality. The parking availability data may comprise the number of available parking spaces in each parking facility in the locality. The parking availability data may be stored in the database 410.

At step 702, the facility parking availability determination module 412 determines the number of available parking spaces in each parking facility in the locality based on the parking availability data received from the section managers 112. At step 704, the locality manager 122 transmits, via the network interface hardware 406, the total number of available parking spaces in all of the parking facilities in the locality.

Figure 8:
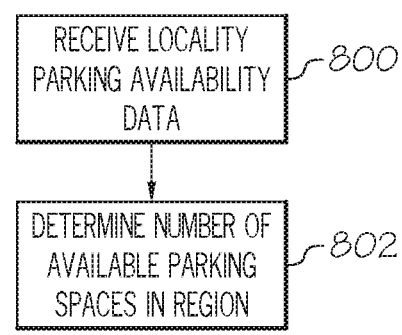
FIG. 8 depicts a flowchart for a method that may be implemented by the city manager to determine the number of parking spaces available within each locality in a region, according to one or more embodiments shown and described herein.

FIG. 8 depicts a flowchart for a method that may be implemented by the city manager 132 to determine the number of parking spaces available in each locality in the region managed by the city manager 132. At step 800, the city manager 132 receives, via the network interface hardware 506, parking availability data from each locality within the region managed by the city manager 132. The parking availability data may comprise the number of available parking spaces within each locality in the region and may be stored in the database 510. At step 802, the locality parking availability determination module 512 determines the number of available parking spaces in each locality in the region based on the parking availability data received from the locality managers 122.

Figure 9:
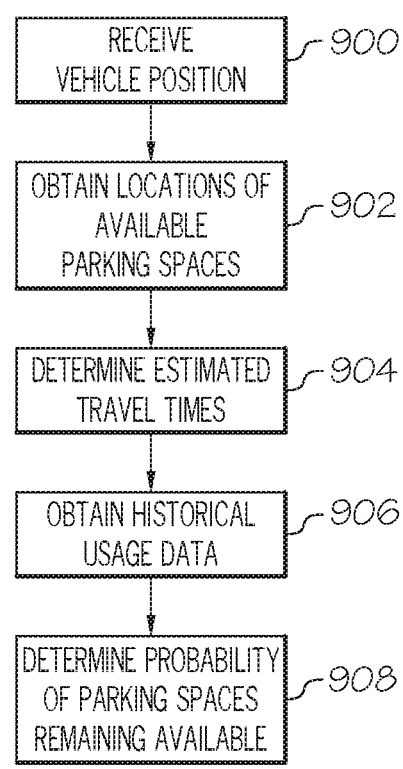
FIG. 9 depicts a flowchart for a method that may be implemented by the section manager to provide parking assistance, according to one or more embodiments shown and described herein.

FIG. 9 depicts a flowchart for a method that may be implemented by the section manager 112 to provide parking assistance to a vehicle. At step 900, the section manager 112 receives a request for parking assistance from a vehicle along with the position of the vehicle.

At step 902, the parking space recognition module 312 determines the locations of available parking spaces in the parking facility. The parking space recognition module 312 may determine the locations of available parking spaces using the method discussed above in connection with FIG. 6.

At step 904, the travel time estimation module 314 determines estimated travel times to each of the available parking spaces in the parking facility identified by the parking space recognition module 312. At step 906, the historical usage data acquisition module 316 acquires historical usage data for the parking facility and the parking spaces therein. At step 908, the parking availability probability determination module 318 determines the probability that each of the available parking spaces identified by the parking space recognition module 312 will be available at a time that the vehicle would arrive at each of the parking spaces.

Figure 10:
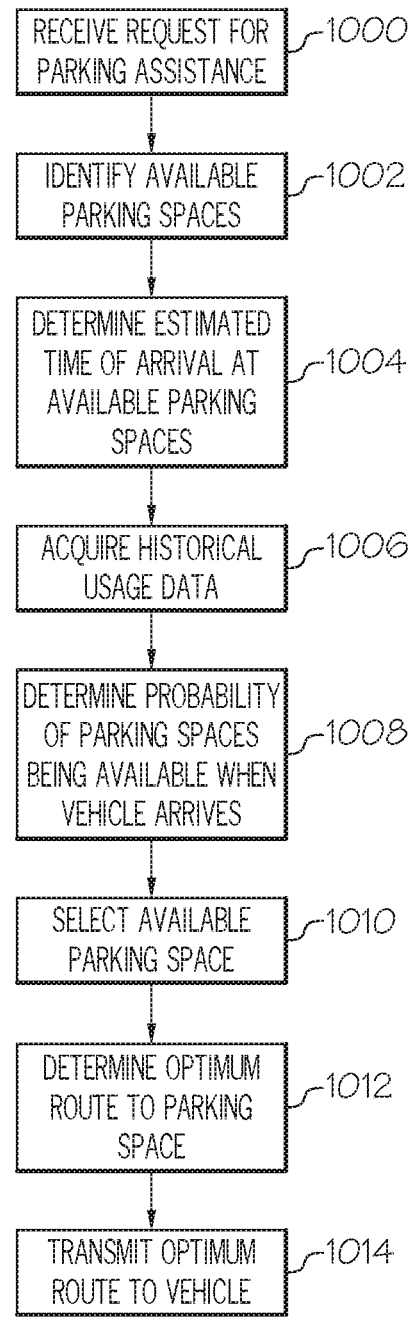
FIG. 10 depicts a flowchart for another method that may be implemented by the section manager to provide parking assistance, according to one or more embodiments shown and described herein.

FIG. 10 depicts a flowchart for another method that may be implemented by the section manager 112 to provide parking assistance to a vehicle. At step 1000, the section manager 112 receives a request for parking assistance from a vehicle. The request for parking assistance includes a position of the vehicle. The request for parking assistance may also include one or more parking-related preferences.

At step 1002, the parking space recognition module 312 identifies one or more available parking spaces in the parking facility. The parking space recognition module 312 may identify available parking spaces using the method described above in connection with FIG. 6.

At step 1004, the travel time estimation module 314 determines an estimated travel time for the vehicle to reach each of the available parking spaces identified by the parking space recognition module 312. The travel time estimation module 314 may determine the estimated travel based on the location of the vehicle, the location of each of the available parking spaces, and a map of the parking facility stored in the database 310.

At step 1006, the historical usage data acquisition module 316 acquires historical usage data for the parking facility. Then, at step 1008, the parking availability probability determination module 318 determines the probability that each of the available parking spaces identified by the parking space recognition module 312 will be available when the vehicle arrives at the parking spaces. The parking availability probability determination module 318 may determine the probabilities based on the available parking spaces and the historical usage data acquired by the historical usage data acquisition module 316.

At step 1010, the parking space selection module 320 selects an available parking space to recommend for the vehicle to park. The parking space selection module 320 may select an available parking space based on the estimated arrival time of the vehicle, the probability of the parking space being available when the vehicle arrives, as well as any preferences received from the vehicle and corresponding features of the available parking spaces.

At step 1012, the route guidance module 322 determines the optimal route for the vehicle to travel to arrive at the selected parking space. The route guidance module 322 may determine the optimal route based on the location of the vehicle, the location of the selected parking space, and the map of the parking facility. Then, at step 1014, the section manager 112 transmits the determined route to the vehicle.

Figure 11:
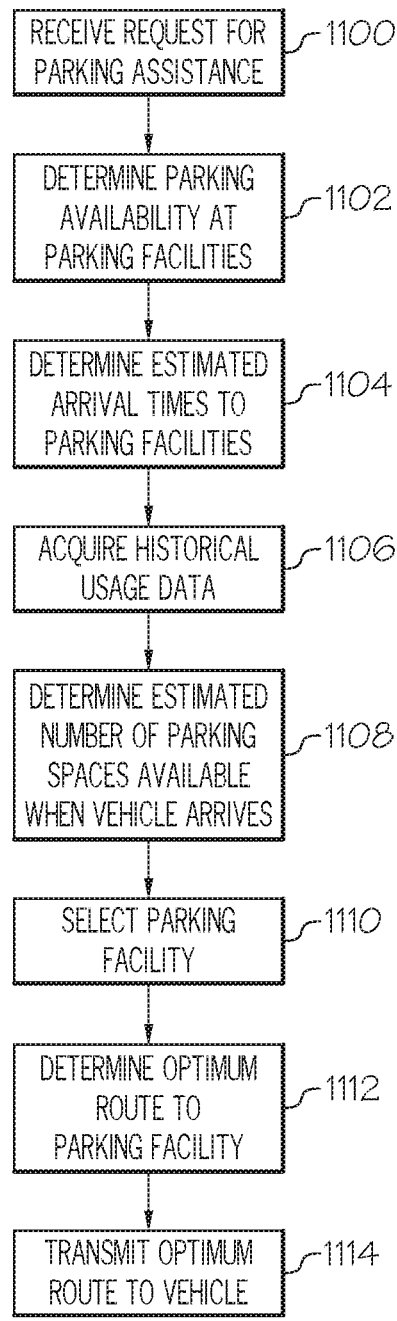
FIG. 11 depicts a flowchart for a method that may be implemented by the locality manager to provide parking assistance, according to one or more embodiments shown and described herein.

FIG. 11 depicts a flowchart for a method that may be implemented by the locality manager 122 to provide parking assistance to a vehicle. At step 1100, the locality manager 122 receives a request from a vehicle for parking assistance. The request for parking assistance includes a location of the vehicle. The request for parking assistance may also include one or more parking-related preferences.

At step 1102, the facility parking availability determination module 412 determines the number of parking spaces available in each of the parking facilities in the locality managed by the locality manager 122. The facility parking availability determination module 412 may determine the number of parking spaces available based on parking availability data received from the section managers 112 that manage the parking facilities in the locality.

At step 1104, the travel time estimation module 414 estimates the travel time for the vehicle to arrive at each of the parking facilities in the locality. The travel time estimation module 414 may estimate the travel times based on the location of the vehicle, the locations of the parking facilities, and a map of the locality stored in the database 410.

At step 1106, the historical facility usage data acquisition module 416 acquires historical usage data for the parking facilities in the locality. Then, at step 1108, the parking facility availability estimation module 418 determines an estimated number of parking spaces that will be available in each parking facility in the locality when the vehicle would arrive at each parking facility. The parking facility availability estimation module 418 may determine this estimated number based on the number of available parking spaces in each parking facility and the historical usage data acquired by the historical facility usage data acquisition module 416.

At step 1110, the parking facility selection module 420 selects a parking facility to recommend for the vehicle to park at. The parking facility selection module 420 may select a parking facility based on the estimated travel time to each parking facility, the estimated number of parking spaces that will be available at each parking facility when the vehicle arrives, as well as any parking-related preferences received from the vehicle and associated features of the parking facilities.

At step 1112, the route guidance module 422 determines the optimal route for the vehicle to travel to arrive at the selected parking facility. The route guidance module 422 may determine the optimal route based on the location of the vehicle, the location of the selected parking facility, and the map of the locality. Then, at step 1114, the locality manager 122 transmits the determined route to the vehicle.

Figure 12:
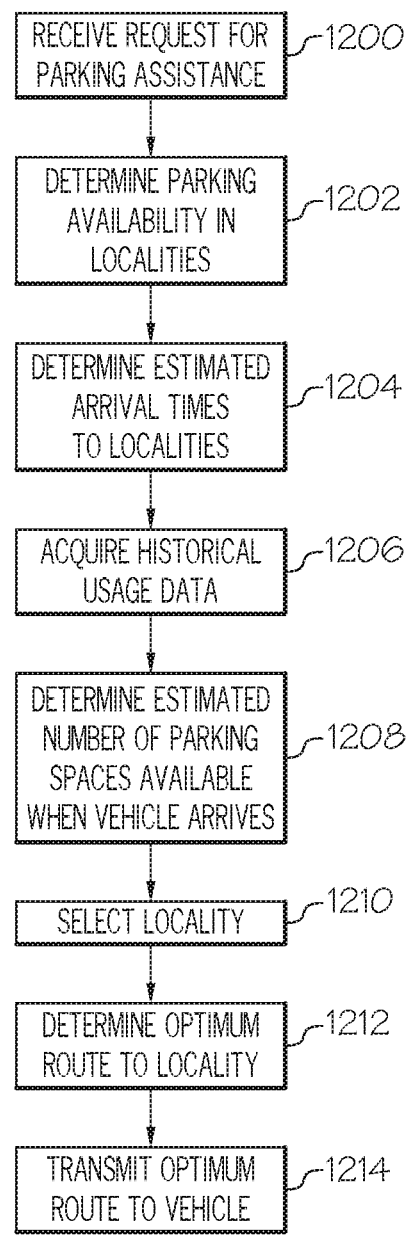
FIG. 12 depicts a flowchart for a method that may be implemented by the city manager to provide parking assistance, according to one or more embodiments shown and described herein.

FIG. 12 depicts a flowchart for a method that may be implemented by the city manager 132 to provide parking assistance to a vehicle. At step 1200, the city manager 132 receives a request from a vehicle for parking assistance. The request for parking assistance includes a location of the vehicle. The request for parking assistance may also include one or more parking-related preferences.

At step 1202, the locality parking availability determination module 512 determines the number of parking spaces available within each locality in the region managed by the city manager 132. The locality parking availability determination module 512 may determine the number of parking spaces available based on parking availability data received from the locality managers 122 that manage the localities in the region.

At step 1204, the travel time estimation module 514 estimates the travel time for the vehicle to arrive at each of the parking facilities in the locality. The travel time estimation module 514 may estimate the travel times based on the location of the vehicle, the locations of the parking facilities, and a map of the region stored in the database 510.

At step 1206, the historical locality usage data acquisition module 516 acquires historical usage data for the localities in the region. Then, at step 1208, the parking locality availability estimation module 518 determines an estimated number of parking spaces that will be available in each locality in the region when the vehicle would arrive at each locality. The parking locality availability estimation module 518 may determine this estimated number based on the number of available parking spaces in each locality and the historical usage data acquired by the historical locality usage data acquisition module 516.

At step 1210, the parking locality selection module 520 selects a locality to recommend for the vehicle to park in. The parking locality selection module 520 may select a locality based on the estimated travel time to each locality, the estimated number of parking spaces that will be available within each locality when the vehicle arrives, as well as any parking-related preferences received from the vehicle and associated features of the localities.

At step 1212, the route guidance module 522 determines the optimal route for the vehicle to travel to arrive at the selected locality. The route guidance module 522 may determine the optimal route based on the location of the vehicle, the location of the selected locality, and the map of the region. Then, at step 1214, the city manager 132 transmits the determined route to the vehicle.

It should be understood that embodiments described herein are directed to a hierarchical system for providing parking assistance to vehicles. The system includes multiple levels of managers in a hierarchical relationship. Section managers each manage a single parking facility and receive sensor data from vehicles in the parking facility. The section managers use the received vehicle sensor data to track available parking spaces within the parking facility. A section manager may receive a request for parking assistance from a vehicle and may guide the vehicle to an available parking space in the parking facility managed by the section manager.

Locality managers operate at a higher hierarchical level than the section managers and each manage a locality comprising one or more parking facilities, each managed by a section manager. The locality managers receive parking availability data from the section managers and use the received parking availability data to track the number of parking spaces available in each parking facility in the locality. A locality manager may receive a request for parking assistance from a vehicle and may guide the vehicle to a less congested parking facility in the locality managed by the locality manager.

City managers operate at a higher hierarchical level than the locality managers and each manage a region comprising one or more localities, each managed by a locality manager. The city managers receive parking availability data from the locality managers and use the received parking availability data to track the number of parking spaces available in each locality in the region. A city manager may receive a request for parking assistance from a vehicle and may guide the vehicle to a less congested locality in the region managed by the city manager.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for managing parking facilities comprising:
   a plurality of first level managers each managing a parking facility; and
   at least one second level manager being in a higher hierarchical level than the plurality of first level managers and managing a locality, wherein:
   each of the plurality of first level managers is configured to:
      receive sensor data from one or more vehicles within the parking facility managed by the first level manager and position data corresponding to a position of each of the one or more vehicles within the parking facility, the parking facility having a plurality of parking spaces; and
   the at least one second level manager is configured to:
      receive facility parking availability data from one or more of the plurality of first level managers in the locality managed by the at least one second level manager,
   wherein a first frequency of the first level managers receiving the sensor data from the one or more vehicles is higher than a second frequency of the at least one second level manager receiving the facility parking availability data from the plurality of first level managers.

2. The system of claim 1, wherein
   each of the plurality of first level managers is configured to:
      identify one or more available parking spaces from the plurality of parking spaces within the parking facility based at least in part on the sensor data and the position data received from the one or more vehicles;
      determine facility parking availability data comprising a number of available parking spaces within the parking facility based at least in part on the sensor data collected from the one or more vehicles and a map associated with the parking facility; and
      transmit the facility parking availability data to one of the at least one second level manager, and
   the at least one second level manager is configured to:
      determine a number of available parking spaces at each parking facility in the locality based at least in part on the facility parking availability data.

3. The system of claim 1, wherein each of the plurality of first level managers is further configured to:
   receive, from a requesting vehicle, a request to locate an available parking space within the parking facility managed by the first level manager;
   receive, from the requesting vehicle, a requesting position corresponding to a position of the requesting vehicle;
   obtain historical usage data for the one or more available parking spaces within the parking facility managed by the first level manager;
   determine an estimated travel time for the requesting vehicle to arrive at each of the available parking spaces based at least in part on the requesting position; and
   for each of the available parking spaces, determine a probability that the parking space will be available when the requesting vehicle arrives at the parking space based at least in part on the estimated travel time and the historical usage data.

4. The system of claim 3, wherein each of the plurality of first level managers is further configured to:
   select one of the available parking spaces as a selected parking space based at least in part on the probability that the selected parking space will be available when the requesting vehicle arrives at the selected parking space; and
   transmit a location of the selected parking space to the requesting vehicle.

5. The system of claim 4, wherein each of the plurality of first level managers is further configured to:
   determine an optimum travel route between the requesting vehicle and the selected parking space based at least in part on the requesting position, the location of the selected parking space, and a map associated with the parking facility; and
   transmit the optimum travel route to the requesting vehicle.

6. The system of claim 1, wherein the at least one second level manager is further configured to:
   receive a request to locate an available parking space within the locality managed by the second level manager from a requesting vehicle;
   receive a requesting position from the requesting vehicle corresponding to a position of the requesting vehicle;
   obtain historical facility usage data for the parking facilities managed by the first level managers in the locality managed by the second level manager;
   determine an estimated travel time for the requesting vehicle to arrive at each of the parking facilities based at least in part on the requesting position; and
   for each of the parking facilities, estimate a number of parking spaces that will be available at the parking facility when the requesting vehicle arrives at the parking facility based at least in part on the estimated travel time and the historical facility usage data.

7. The system of claim 6, wherein the at least one second level manager is further configured to:
   select one of the parking facilities as a selected parking facility based at least in part on the estimated number of parking spaces that will be available at the selected parking facility when the requesting vehicle arrives at the selected parking facility; and transmit a location of the selected parking facility to the requesting vehicle.

8. The system of claim 7, wherein the at least one second level manager is further configured to:
   determine an optimum travel route between the requesting vehicle and the selected parking facility based at least in part on the requesting position and the location of the selected parking facility; and
   transmit the optimum travel route to the requesting vehicle.

9. The system of claim 1, further comprising:
   at least one third level manager being in a higher hierarchical level than the at least one second level manager and managing a region greater than the locality, wherein:
   the at least one second level manager comprises a plurality of second level managers;
   each of the plurality of second level managers is configured to:
      determine locality parking availability data comprising a number of available parking spaces within the locality managed by the second level manager based at least in part on the facility parking availability data received from the plurality of first level managers in the locality managed by the second level manager; and
      transmit the locality parking availability data to one of the at least one third level manager, and
   the at least one second level manager is configured to:
      receive locality parking availability data from one or more of the plurality of second level managers in the region managed by the at least one third level manager; and
      determine a number of available parking spaces within each locality in the region based at least in part on the locality parking availability data.

10. The system of claim 9, wherein the second frequency of the plurality of second level managers receiving the facility parking availability data from the plurality of first level managers is higher than a third frequency of the at least one third level manager receiving the locality parking availability data from the plurality of second level managers.

11. The system of claim 9, wherein the at least one third level manager is further configured to:
   receive a request to locate an available parking space within the region managed by the third level manager from a requesting vehicle;
   receive a requesting position from the requesting vehicle corresponding to a position of the requesting vehicle;
   obtain historical locality usage data for the localities in the region managed by the third level manager;
   determine an estimated travel time for the requesting vehicle to arrive at each of the localities based at least in part on the requesting position;
   for each of the localities, estimate a number of parking spaces that will be available within the locality when the requesting vehicle arrives at the locality based at least in part on the estimated travel time and the historical locality usage data;
   select one of the localities as a selected locality based at least in part on the estimated number of parking spaces that will be available within the locality when the requesting vehicle arrives at the selected locality; and
   transmit a location of the selected locality to the requesting vehicle.

\* \* \* \* \*

UNITED STATES PATENT AND TRADEMARK OFFICE
CERTIFICATE OF CORRECTION

PATENT NO. : 11,081,004 B1  
APPLICATION NO. : 16/778816  
DATED : August 3, 2021  
INVENTOR(S) : Takamasa Higuchi and Kentaro Oguchi Page 1 of 1

It is certified that error appears in the above-identified patent and that said Letters Patent is hereby corrected as shown below:

In the Specification

In Column 4, Line(s) 60, before "through", delete "L" and insert --L1--, therefor.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*